April 18, 1950     T. ROSTAN     2,504,452
MOTOR BICYCLE CONSTRUCTION
Filed July 5, 1945     2 Sheets-Sheet 1
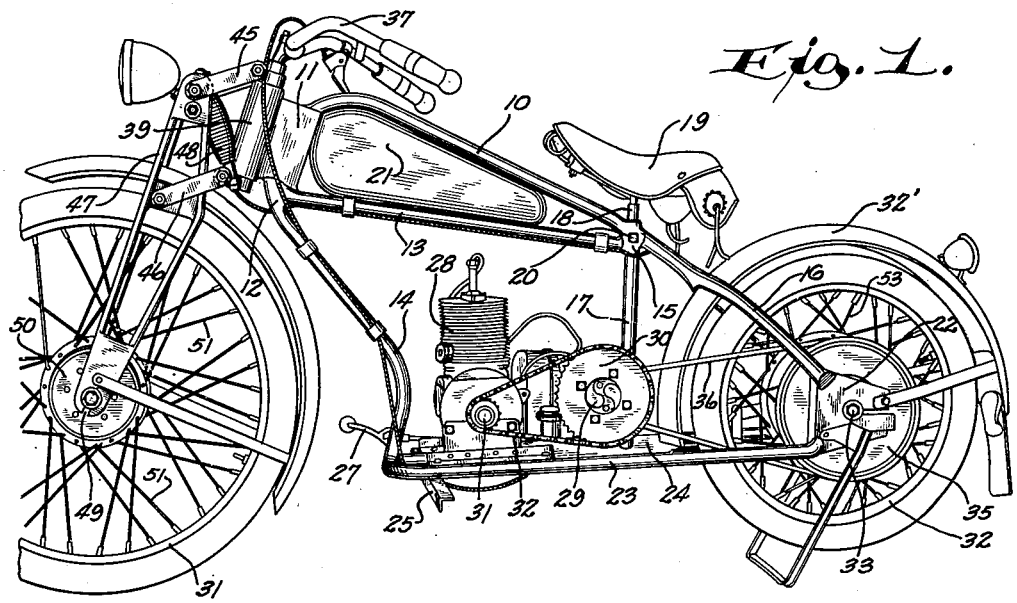
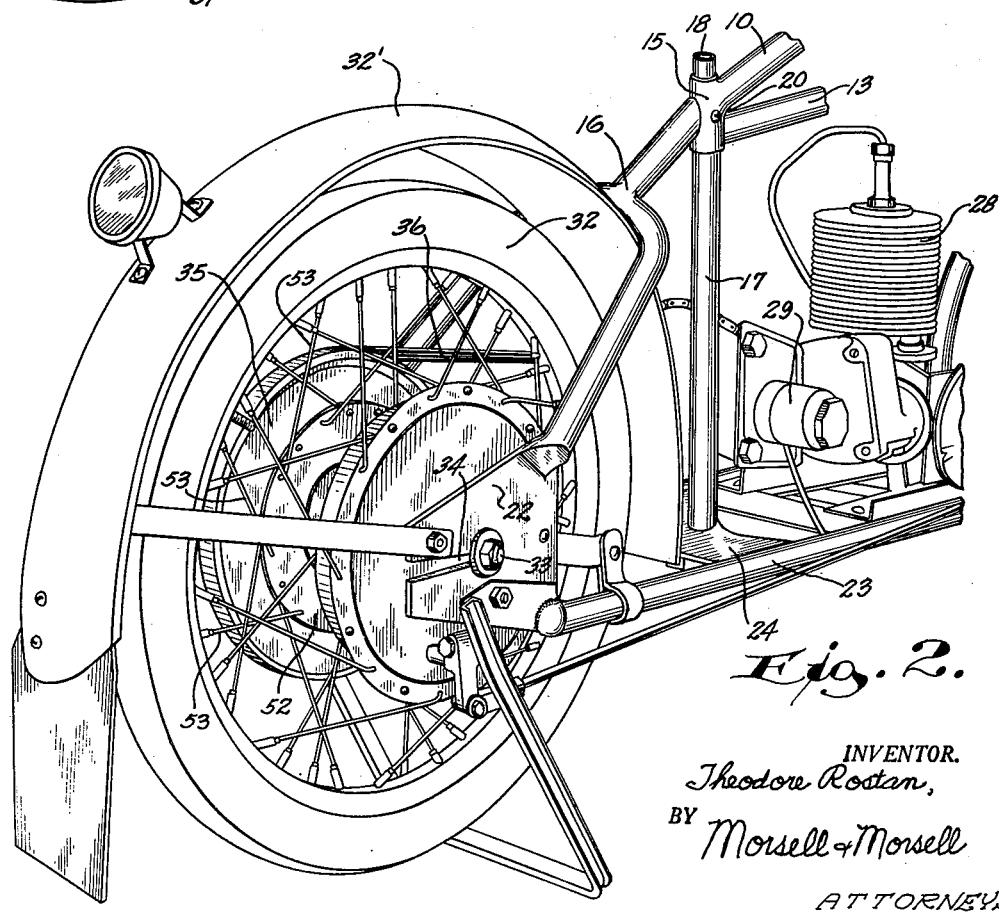
INVENTOR.
Theodore Rostan,
BY Morsell & Morsell
ATTORNEYS April 18, 1950 T. ROSTAN 2,504,452
MOTOR BICYCLE CONSTRUCTION
Filed July 5, 1945 2 Sheets-Sheet 2
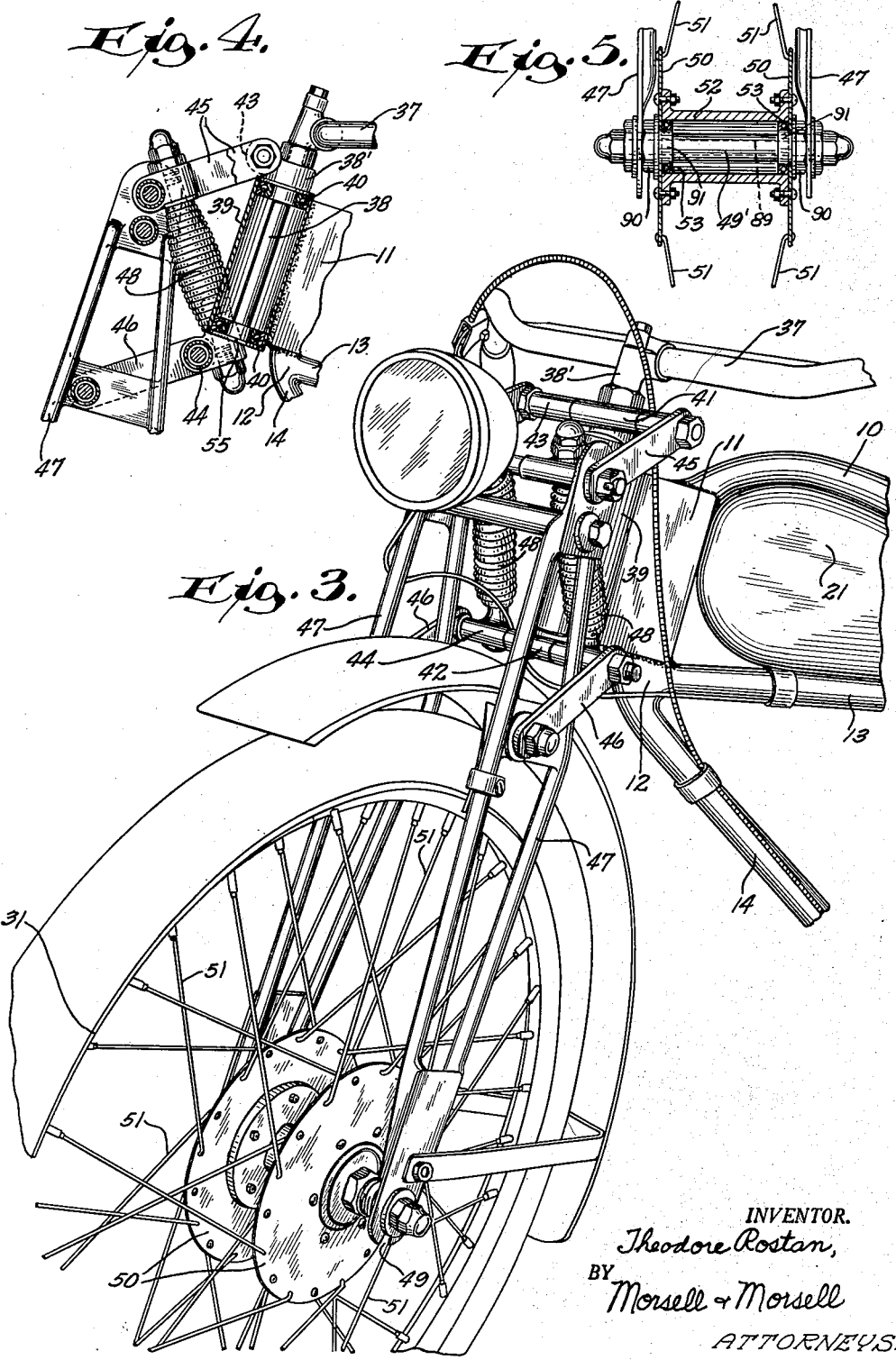
INVENTOR.
Theodore Rostan,
BY Morsell & Morsell
ATTORNEYS.

Patented Apr. 18, 1950

2,504,452

UNITED STATES PATENT OFFICE 2,504,452

MOTOR BICYCLE CONSTRUCTION

Theodore Rostan, Milwaukee, Wis.

Application July 5, 1945, Serial No. 603,303

2 Claims. (Cl. 180—33)

This invention relates to improvements in motor bicycle construction.

A general object of the invention is to provide an improved motor bicycle construction utilizing a novel, simple, light but sturdy frame which permits the compact mounting thereon of a motor and all accessories in a manner to enhance the balance of the bicycle and to insure the comfort and ease of operation of the rider.

A further object of the invention is to provide a motor bicycle construction wherein the frame is formed in a novel and effective shape through the use of sections of tubing of simple forms welded together in a manner so that any portion of the frame may be replaced, if necessary, the frame being rearwardly, downwardly inclined to permit the mounting thereon of a relatively large diameter front wheel and a smaller rear wheel which enhances the balance of the bicycle, provides for better gear ratio, and permits a low mounting for the seat or saddle whereby the rider may assume a comfortable relaxed position with perfect control over the bicycle and operating parts thereof.

A further object of the invention is to provide a motor bicycle frame adapted to carry and have associated therewith component parts and accessories which are standard bicycle equipment and which are, therefore, readily available and inexpensive.

A further object of the invention is to provide a motor bicycle construction including a sectional front fork having means for varying the width of the fork to accommodate tires of varying sizes, said fork permitting the ready removal of the front wheel without pulling the inner axel or spreading the fork.

A further object of the invention is to provide, in a motor bicycle construction, an improved and simple rear wheel mount which permits adjustments to vary the tension in the chain or belt extended between the motor drive shaft and the rear axle.

A further object of the invention is to provide, in a motor bicycle construction, simple inexpensive and strong wheel hub arrangements.

A further object of the invention is to provide a motor bicycle construction wherein the lower portion of the frame is formed to provide a mounting platform for the motor and as a support for a foot rest, the latter projecting laterally of the frame to provide leg clearance relative to the motor and also serving as guards to prevent the bicycle falling against the rider in the event of an accident or spill.

A further object of the invention is to provide a motor bicycle construction which is extremely light and compact, which is strong and durable, which is inexpensive to manufacture, which possesses a unique and attractive appearance, and which is well adapted for the purposes described.

With the above and other objects in view the invention consists of the improved motor bicycle construction and its parts and combinations, as set forth in the claims, and all equivalents thereof.

In the accompanying drawings in which the same reference characters indicate the same parts in all of the views:

Fig. 1 is a side elevation, in slight perspective, of the improved motor bicycle construction;

Fig. 2 is an enlarged rear and side fragmentary perspective view;

Fig. 3 is an enlarged front and side fragmentary perspective view;

Fig. 4 is an enlarged fragmentary detail sectional view of the front fork portion of the motor bicycle and parts directly affiliated therewith, portions being shown in section; and Fig. 5 is an enlarged fragmentary detail sectional view of the hub and axle assembly of the front wheel of the motor bicycle.

Referring now more particularly to the drawings it will appear that the frame of the improved motor bicycle is simple, light but sturdy, and has a shape or configuration of considerable advantage. The frame is made up of suitably shaped extents of metal tubing which are welded together, with the result that if any portion of the frame becomes damaged in use, it can be readily replaced by the removal of the defective section and its replacement by another section welded into the frame.

As will appear best from Fig. 1 of the drawings, the frame includes a top bar 10 curved at its forward end and welded or otherwise secured to a connecting plate 11, which plate also has welded or otherwise secured to its lower end a branch connection 12 from which extends rearwardly, an intermediate longitudinal frame bar 13, and also, there is a downwardly extending curved front frame bar 14. The intermediate bar 13 is only slightly downwardly inclined from horizontal, toward the rear of the frame, while the top bar 10 extends rearwardly downwardly at a considerable angle converging with the intermediate bar 13 toward the rear upper portion of the frame in a socketed, tubular union 15 from which extends rearwardly, downwardly a rear wheel fork 16. From the union there also extends vertically downwardly a rear frame post 17 and projecting upwardly from the union member 15 is a socket 18 to adjustably receive the depending post of a seat or saddle 19. The mounting of said seat or saddle is more or less conventional and its post is held within the socket member in a desired position of adjustment by a clamping bolt 20.

In the space between the top frame bar 10 and the intermediate frame bar 13 a fuel tank 21 is conveniently mounted. Said fuel tank may be equipped with a suitable filling opening, and as is conventional, a fuel feeding tube may be extended between the fuel tank and an operating motor, later to be described.

The lower extremities of the spaced arms of the rear wheel fork 16 of the frame are welded or otherwise secured to spaced rear wheel mounting plates 22. Likewise, the rear end portions of the side arms 23 of a lower deck or platform frame are secured to said plates 22, extending substantially horizontally forwardly therefrom and having their forward ends curved into convergence and secured to the lower end of the front frame bar 14. Said platform elements 23 carry therebetween, and forwardly of the rear wheel of the bicycle, a flat deck or supporting platform 24 to which is secured the lower end of the vertical rear post 17 of the frame. The under forward ends of the deck elements 23 also have mounted transversely thereon a foot rest 25 which projects laterally of both sides of the frame substantially, to provide leg clearance for the bicycle rider relative to the motor and operating parts carried by the platform 24. The projecting ends of the foot rest 25 also serve as guards or supports to prevent the vehicle from falling on the rider in the event of a spill or accident. The deck or platform elements 23 also provide for the convenient mounting thereon of a foot operated brave lever 27, or the like.

A suitable internal combustion engine 28 is mounted on the platform 24, and it can be of any suitable design. Associated with the motor in its mounting on the platform 24 is a clutch controlled countershaft unit 29 carrying thereon a large sprocket wheel or pulley 30 which is driven from the motor shaft 31 by a chain or belt 32.

The rear wheel of the bicycle, which is of considerably less diameter than the front wheel 31, is designated by the numeral 32, and it is, of course, designed to be the driving wheel of the motor bicycle and operates within the bifurcated portion of the forked frame bar 26, a portion of its periphery being suitably protected by a curved rear fender or mud guard 32' supported on the forked member 16 and on the bottom platform 24. The rear wheel hub, which will be dealt with more fully hereinafter, includes an axially extended inner axle 33 which is clamped within slotted portions 34 of the rear wheel plates 22 in a desired position of longitudinal adjustment. The rear wheel hub assembly also includes fast thereon a relatively large diameter pulley or sprocket 35 drivingly engaged by an endless belt or chain 36, which also extends to and is driven by a small sprocket (not shown) on the clutch controlled countershaft 29.

The front fork arrangement and construction is best shown in Figs. 1, 3 and 4. It will be noted that an intermediate portion of the handlebars 37 are adjustably carried by a steering post 38 revolubly mounted relative to a cylindrical extension 39 on the connecting plate 11, portions of said steering post 38 within the cylindrical ex- tension 39 being reduced and being mounted in bearings 40. Upper and lower bands 41 and 42 which clampingly embrace upper and lower horizontal spacer rods 43 and 44 are connected with the steering post enlargement 38' and with a disc 55 fast on the lower end of the steering post. Said rods 43 and 44 also carry at their extremities forwardly downwardly projecting straps 45 and 46 whose outer ends are pivotally connected to spaced side portions of front fork side members 47, thereby serving to mount said front fork side members relative to the handlebar and steering post in a forwardly offset relationship. Shock and rebound springs 48 are also interposed between portions of this assemblage. The lower portions of the front fork side arms 47 are formed with plates which are slotted, as at 49, to adjustably receive therein spaced extended end portions of a front wheel inner axle 89 (see Fig. 5). The spacers control the width of the front fork and by changing the length of the spacers and the front wheel axle, any desired width can be obtained, within limitations, to accommodate various sizes of tires with which the front wheel 31 may be equipped. The construction is such that the front wheel may readily be removed from the front fork without the necessity of pulling the inner axle 49 or spreading the sides 47 of the front fork.

The front wheel 31 is provided with a hub of novel and advantageous formation. This hub construction, best shown in Figs. 3 and 5, includes a pair of relatively large suitably spaced side plates 50 provided around their peripheries with spaced apertures in which the inner ends of the wheel spokes 51 are anchored. The plates 50 are secured to the spaced end flanges of a cylindrical hub member 52 which is revolubly mounted on bearings 53 relative to an intermediate axle member 49'. It will therefore be evident that the front wheel hub and axle assembly shown in Fig. 5 comprises the cylindrical hub 52, the intermediate axle member 49' within the hub, and the elongated inner axle 89 within the intermediate axle member 49'. The slotted portions 49 (see Fig. 3) of the spaced side arms 47 of the front fork are engaged by the extended end portions of the inner axle member 89 whereby the wheel hub and axle assemblage is securely carried by the fork. The construction provides ready means for adjusting or centering the front wheel on the intermediate axle member 49' which is accomplished by loosening the lock nuts 90 and turning the cones 91 inwardly thereof in a direction effective to axially shift the wheel as desired. An adjustment of this nature may be desirable if the front wheel is out of alinement with the rear wheel or if an adjustment to compensate for torque is necessary.

The hub arrangement for the rear wheel 32 is substantially similar in general to that described in connection with the front wheel, except that the same carries the pulley or sprocket 35, previously mentioned, and in place of a side plate on one end of the rear hub there is a brake drum 5 having apertures therein for the anchorage of the inner ends of the wheel spokes 53.

Standard bicycle hanger cups and bearings are used in the steering post cylinder 39 and in the front and rear wheel hubs. Both hub members comprise the inner axles referred to and outer axle members. The outer axles are locked in place by means of nuts and lock washers and afford the means for properly spacing the wheels between the fork members. As a result of the arrangement after the wheels are properly centered, the same are readily removable merely by loosening the inner axles relative to the slotted fork members, and the adjustment of the wheels and hubs is not disturbed.

As was noted heretofore, the front wheel 31 is of substantially greater diameter than the rear wheel 32. This enhances the balance of the bicycle and the smaller rear wheel insures better gear ratio. The small rear wheel assures a very low center of gravity for the bicycle and reduces the hazard of accidents, besides improving balance and traction.

From the foregoing description, it will be noted that in the improved motor bicycle construction the uniquely shaped and fabricated frame is light and durable, permits of great riding comfort, is easily assembled and repaired and permits the compact convenient mounting thereon of the various accessories and operating parts heretofore described.

The front fork is uniquely carried by pairs of links arranged in parallel relationship and resiliently movable against the associated springs 48. It will be observed that the connections of said links with the journal or steering post 38 is such that the pairs of links engage opposite ends of the steering post, thereby making for compactness of the assembly and reducing the height of the front end of the bicycle.

The front fork assemblage of the bicycle is simple and advantageous and the front fork, as well as the rear fork, both provide for the adjustable mounting of the front and rear wheels respectively and also permit the ready removal of said wheels without disturbing adjustments and the inner axle member. The improved motor bicycle construction is additionally relatively inexpensive, neat and attractive in appearance and well adapted for the purposes described.

What is claimed as the invention is:

1. In a motor bicycle of the character described, a frame having an upper bar which is downwardly rearwardly inclined, a rear wheel fork secured to and extending rearwardly downwardly from the rear of said upper bar, the lower extremities of said rear wheel fork rigidly carrying plates, a relatively small diameter rear wheel journalled between said plates, relatively horizontal, laterally separated lower platform arms secured to and extending forwardly from said plates at an elevation considerably below the upper bar, a platform carried by and spanning forward portions of said arms, a relatively large diameter front wheel operatively mounted at the forward upper end of said frame, handle bars connected with said front wheel to effect pivoting thereof, a saddle seat mounted low on the frame adjacent the junction of the frame upper bar with the rear wheel fork, means extending upwardly from the platform cooperating in the support and mounting of the saddle seat, a motor mounted on said platform, drive means connecting said motor with said rear wheel for propulsion of the bicycle, and a foot support transversely carried by forward portions of said platform mounting arms and adapted to be engaged by the feet of a rider carried by said seat in a sitting posture.

2. In a motor bicycle of the character described, a frame having an upper bar which is downwardly rearwardly inclined, a rear wheel fork secured to and extending rearwardly downwardly from the rear of said upper bar, the lower extremities of said rear wheel fork rigidly carrying plates, a rear wheel journalled between said plates, relatively horizontal, laterally separated lower platform arms secured to and extending forwardly from said plates at an elevation considerably below the upper bar, a platform carried by and spanning forward portions of said arms, a front wheel operatively mounted at the forward upper end of said frame, handle bars connected with said front wheel to effect pivoting thereof, a saddle seat mounted on the frame adjacent the junction of the frame upper bar with the rear wheel fork, means extending upwardly from the platform cooperating in the support and mounting of the saddle seat, a motor mounted on said platform, drive means connecting said motor with said rear wheel for propulsion of the bicycle, and a foot support transversely carried by forward portions of said platform mounting arms.

THEODORE ROSTAN.

REFERENCES CITED

The following references are of record in the file of this patent:

UNITED STATES PATENTS

| Number | Name | Date |
|---|---|---|
| 476,974 | Bolte | June 14, 1892 |
| 946,143 | Levedahl | Jan. 11, 1910 |
| 1,198,669 | Schwinn | Sept. 19, 1916 |
| 2,187,020 | Dunn | Jan. 16, 1940 |
| 2,246,492 | Aldridge | June 24, 1941 |
| 2,331,976 | Hare | Oct. 19, 1943 |

FOREIGN PATENTS

| Number | Country | Date |
|---|---|---|
| 168,730 | Great Britain | Sept. 15, 1921 |
| 402,165 | Great Britain | Nov. 30, 1933 |